(12) United States Patent
Miller

(10) Patent No.: US 12,190,429 B2
(45) Date of Patent: Jan. 7, 2025

(54) METHOD AND SYSTEM FOR CONSTRUCTION PROJECT MANAGEMENT USING PHOTO IMAGING MEASUREMENTS

(71) Applicant: William Ernest Miller, Union City, NJ (US)

(72) Inventor: William Ernest Miller, Union City, NJ (US)

(*) Notice: Subject to any disclaimer, the term of this patent is extended or adjusted under 35 U.S.C. 154(b) by 990 days.

(21) Appl. No.: 17/183,704

(22) Filed: Feb. 24, 2021

(65) Prior Publication Data

US 2021/0183128 A1    Jun. 17, 2021

Related U.S. Application Data

(63) Continuation-in-part of application No. 16/742,094, filed on Jan. 14, 2020, now abandoned, which is a
(Continued)

(51) Int. Cl.
| | | |
|---|---|---|
| *G06T 15/00* | (2011.01) | |
| *G06F 3/04815* | (2022.01) | |
| *G06F 16/50* | (2019.01) | |
| *G06F 16/53* | (2019.01) | |
| *G06F 16/56* | (2019.01) | |

(Continued)

(52) U.S. Cl.
CPC ........ *G06T 15/005* (2013.01); *G06F 3/04815* (2013.01); *G06F 16/50* (2019.01); *G06F 16/53* (2019.01); *G06F 16/56* (2019.01); *G06F 16/58* (2019.01); *G06F 21/36* (2013.01); *G06Q 10/06313* (2013.01); *G06Q 30/0621* (2013.01); *G06Q 30/0643* (2013.01); *G06T 11/60* (2013.01); *G06T 17/20* (2013.01); *G06V 20/20* (2022.01); *H04L 9/40* (2022.05); *G06T 2207/10004* (2013.01); *G06T 2207/20221* (2013.01); *H04N 1/00204* (2013.01); *H04N 13/275* (2018.05); *H04N 2201/0081* (2013.01)

(58) Field of Classification Search
None
See application file for complete search history.

(56) References Cited

U.S. PATENT DOCUMENTS

| | | |
|---|---|---|
| 7,409,392 B2 | 8/2008 | Greer et al. |
| 7,747,457 B2 | 6/2010 | Cullen, III et al. |

(Continued)

OTHER PUBLICATIONS

Chi, Hung-Lin, Shih-Chung Kang, and Xiangyu Wang. "Research trends and opportunities of augmented reality applications in architecture, engineering, and construction." Automation in construction 33 (2013): 116-122. (Year: 2013).*

(Continued)

*Primary Examiner* — Gurkanwaljit Singh
(74) *Attorney, Agent, or Firm* — Gearhart Law, LLC

(57) ABSTRACT

The present invention is a method and system of small construction project management by way of photo imaging and measurement capture for use by do-it-yourselfers, handymen and small contractors. The method and system operates on mobile computing devices and includes an image recognition system. By performing various imaging based measurements and then processing the resultant data, the method and system produces bills of materials. invoices, and receipts for the necessary tools and materials required by a construction project.

17 Claims, 15 Drawing Sheets

Related U.S. Application Data continuation of application No. 14/625,790, filed on Feb. 19, 2015, now Pat. No. 10,540,801.

(60) Provisional application No. 61/942,162, filed on Feb. 20, 2014.

(51) Int. Cl.

| | |
|---|---|
| *G06F 16/58* | (2019.01) |
| *G06F 21/36* | (2013.01) |
| *G06Q 10/0631* | (2023.01) |
| *G06Q 30/0601* | (2023.01) |
| *G06T 11/60* | (2006.01) |
| *G06T 17/20* | (2006.01) |
| *G06V 20/20* | (2022.01) |
| *H04L 9/40* | (2022.01) |
| *H04N 1/00* | (2006.01) |
| *H04N 13/275* | (2018.01) |

(56) References Cited

U.S. PATENT DOCUMENTS

| | | | |
|---|---|---|---|
| 7,835,934 B2 | 11/2010 | Gunderson et al. | |
| 8,818,924 B2* | 8/2014 | Wayne | G06F 30/13 706/45 |
| 9,081,917 B2 | 7/2015 | Currin et al. | |
| 9,222,771 B2* | 12/2015 | Rosengaus | G01C 15/002 |
| 9,336,629 B2 | 5/2016 | Finn et al. | |
| 9,443,354 B2* | 9/2016 | Scavezze | G06F 18/24 |
| 9,489,103 B2 | 11/2016 | Brier et al. | |
| 10,078,320 B2 | 9/2018 | Rivers et al. | |
| 10,282,600 B2 | 5/2019 | Curlander et al. | |
| 2002/0198755 A1 | 12/2002 | Birkner et al. | |
| 2003/0050871 A1 | 3/2003 | Broughton | |
| 2004/0006566 A1* | 1/2004 | Taylor | G06Q 10/10 |
| 2005/0195216 A1 | 9/2005 | Kramer et al. | |
| 2006/0015475 A1 | 1/2006 | Birkner et al. | |
| 2006/0026009 A1* | 2/2006 | Luhr | G06Q 50/165 705/315 |
| 2006/0044307 A1* | 3/2006 | Song | G06T 11/206 345/419 |
| 2006/0173775 A1 | 8/2006 | Cullen, III et al. | |
| 2006/0190391 A1 | 8/2006 | Cullen, III et al. | |
| 2006/0203261 A1 | 9/2006 | Kacker | |
| 2007/0087756 A1* | 4/2007 | Hoffberg | G06Q 10/06375 455/450 |
| 2007/0226258 A1 | 9/2007 | Lambdin et al. | |
| 2008/0120129 A1 | 5/2008 | Seuber et al. | |
| 2009/0063557 A1* | 3/2009 | MacPherson | G06N 5/02 |
| 2010/0191611 A1 | 7/2010 | Biro | |
| 2010/0198652 A1 | 8/2010 | Spanton, Jr. et al. | |
| 2010/0332355 A1* | 12/2010 | Lopez | G06Q 10/06 703/1 |
| 2011/0037764 A1 | 2/2011 | Saleem | |
| 2011/0043652 A1 | 2/2011 | King et al. | |
| 2011/0096174 A1 | 4/2011 | King et al. | |
| 2011/0166905 A1* | 7/2011 | Wright | G06Q 40/00 705/7.23 |
| 2013/0061189 A1 | 3/2013 | Brier et al. | |
| 2013/0061198 A1* | 3/2013 | Brier | G06F 3/0481 716/139 |
| 2013/0096873 A1* | 4/2013 | Rosengaus | G01C 15/002 702/155 |
| 2013/0132440 A1 | 5/2013 | Carlson et al. | |
| 2013/0138606 A1 | 5/2013 | Kahle et al. | |
| 2013/0246119 A1* | 9/2013 | Slaughenhoupt | G06Q 10/0633 705/7.27 |
| 2014/0095133 A1 | 4/2014 | Silva et al. | |
| 2014/0210947 A1* | 7/2014 | Finn | G06T 7/73 348/46 |
| 2014/0214473 A1 | 7/2014 | Gentile et al. | |
| 2014/0258428 A1 | 9/2014 | Agarwal et al. | |
| 2014/0368373 A1 | 12/2014 | Crain et al. | |
| 2014/0368378 A1* | 12/2014 | Crain | H01Q 15/14 342/25 A |
| 2015/0112647 A1* | 4/2015 | Currin | H04L 67/10 703/1 |
| 2015/0120389 A1 | 4/2015 | Zhang et al. | |
| 2015/0121196 A1 | 4/2015 | Ye et al. | |
| 2015/0186965 A1 | 7/2015 | Paul | |
| 2015/0379623 A1 | 12/2015 | Gadre et al. | |
| 2016/0042402 A1 | 2/2016 | Gadre et al. | |
| 2016/0063588 A1 | 3/2016 | Gadre et al. | |
| 2016/0210738 A1 | 7/2016 | Curlander et al. | |
| 2016/0226308 A1 | 8/2016 | Valin et al. | |
| 2016/0300293 A1 | 10/2016 | Nagar | |

OTHER PUBLICATIONS

Wang, Xiangyu, et al. "A conceptual framework for integrating building information modeling with augmented reality." Automation in construction 34 (2013): 37-44. (Year: 2013).*

* cited by examiner

METHOD AND SYSTEM FOR CONSTRUCTION PROJECT MANAGEMENT USING PHOTO IMAGING MEASUREMENTS

CROSS-REFERENCE TO RELATED APPLICATION(S)

The present application claims the benefit of co-pending U.S. application Ser. No. 14/625,790 filed on Feb. 19, 2015, which claims the benefit of U.S. provisional application No. 61/942,162, filed on Feb. 20, 2014, the entire disclosure of which is incorporated by reference as if set forth in its entirety herein.

FIELD OF INVENTION

The present invention relates to a method and system for photo imaging and measurement, and more particularly, to a comprehensive small construction project management system.

BACKGROUND

Do-it-yourselfers, handymen and small contractors are frequently involved with small construction projects that require various raw tools and materials that need to be obtained for the projects. The purchasing process for these raw tools and materials may frequently require various precise measurements and calculations to determine the correct bill of materials, which includes the correct list of tools, and a determination of the required quantities of materials.

There is a need by do-it-yourselfers, handymen and small contractors for a photo imaging and measurement system operating on various computing devices, both mobile and desktop, that includes an an imaging recognition system. The photo imaging and measurement system should allow users to scan and input various data related to construction projects. The system when manipulated would then produce lists of required tools and materials based on the construction project data.

The present invention is a method and system of photo imaging and measurement for use by do-it-yourselfers, handymen and small construction contractors. By performing various imaging based measurements and then processing the resultant data, the method and system produces lists of tools and materials needed to complete project bills of materials, invoices, and receipts. The present invention accomplishes these objectives.

SUMMARY

A photo imaging and measurement Application (PIM-P Application) operates on a Computing Device. In some embodiments of the invention, the Computing Device may be a Mobile, Desktop, Laptop, or other CPU device. The Computing Device may comprise an iPhone, iPad, Android phone, Blackberry, Personal Computer, etc., but is not limited to these exclusive examples. In one embodiment of the invention, the PIM-P Application may be utilized in either offline mode or online mode.

In offline mode, login to and execution of the PIM-P Application occurs on the computing device. Once the Application is accessed, the default status of the system is "offline." If the choice is made to remain offline, the Application prompts to perform "limited" system calibration local to the mobile/desktop computing device. In offline mode, images, measurements and data may be collected and stored locally on the Computing Device, but cannot be fully processed until the system status enters online mode and the various system servers are accessed.

If the choice is made to go "online," connection to the internet is made through a Main Web Server which receives and directs data and processing requests to the various system servers and relational data bases. The PIM-P Application is now able to access and integrate with the various system servers and the functional software capabilities, which are the remote Software as a Service (SaaS) platform.

System calibration SaaS processing occurs in the "online" mode, when required data is collected on the Computing Device and relayed to the System Calibration Server via the Main Web Server. Data received and processed by the System Calibration Server is then stored in the System Calibrate RDB according to the calibration process used: either Frame of Reference; Point of Reference; or 3D Scan.

System processes and calculations (SaaS processing) occur in the "online" mode, when required data is collected on the Computing Device and relayed to the System Processes Server via the Main Web Server. Project Name, Photo Image, and Dimension measurements are processed by the System Processes Server, and then stored along with Project Guide URLs and Tools and Materials in the Project Information RDB.

On completing the initial processing of Project Information above, the system notifies the PIM-P Application locally on the Computing Device to select a Project Guide. Selecting a Project Guide link from the displayed list, accesses the Vendor eCommerce Site, via the Main Web Server and the Retail Vendor Web Server in order to view the Project Guide "How To" video. At this point, the Retail Vendor eCommerce Site remains visibly open and accessible to the user while other system processes are carried out by the other remote SaaS functions.

The selected Project Guide data and a system prompt to calculate tools and materials quantities are sent via the Main Web Server to the System Processes Server. Based on the Project Guide video selected, the System Processes Server retrieves the project Dimensions and the recommended Tools and Materials from the Project Information RDB to calculate required project Tools and Materials quantities lists. The Required Tools list prompts the System Process Server to access the Preferred Tool Vendor Web Server and Tool Sku RDB via the Main Web Server to retrieve and display in the Preferred Tool Vendor tools matching the Required Tools list, in the Application on the Computing Device. Required Tools and Materials are now selected for purchase on the Retail Vendor eCommerce Site in standard "Shopping Cart" and "Checkout" format.

In one aspect, a method is disclosed that includes: collecting visual data of a room via a mobile computing device, including calculating dimensions of at least one aspect of the room based on an interaction with a touch enabled display of the mobile computing device; displaying a plurality of project resource templates related to improvement projects; selecting a project resource template in response to a user input; displaying a plurality of design components based on a selected project resource template and calculated dimensions of the at least one aspect of the room; displaying an augmented reality environment of the room on the touch-enabled display, the augmented reality environment configured to allow a user to engage with a selected design component to manipulate a location and orientation of the selected design component within the augmented reality environment; generating a cost estimate and a set of materials to complete a project with the selected design component; and providing an online cart for purchasing the selected design component and set of materials.

A further aspect provides a method comprising collecting visual data of a room via a mobile computing device, including calculating dimensions of at least one aspect of the room based on an interaction with a touch enabled display of the mobile computing device; executing a machine learning algorithm on collected visual data, the machine learning algorithm configured to select and display a plurality of design components related to a project based on the visual data; and displaying an augmented reality environment of the room on the touch enabled display, the augmented reality environment configured to allow a user to engage with a selected design component to manipulate a location and orientation of the selected design component within the augmented reality environment.

A still further aspect provides a system comprising a memory; and a processor coupled to the memory and configured to: collect visual data of a room via a mobile computing device, including calculating dimensions of at least one work area of the room based on an interaction with a touch enabled display of the mobile computing device; display a plurality of project resource templates; receive a selected project resource template in response to a user input; display a plurality of design components based on the selected project resource template and calculated dimensions of the work area; display an augmented reality environment of the room on the touch-enabled display, the augmented reality environment configured to allow a user to engage with a selected design component to manipulate a location and orientation of the selected design component within the augmented reality environment; generate a cost estimate and a set of materials to complete a project with the selected design component; and provide an online cart for purchasing the selected design component and set of materials.

Other features and advantages of the present invention will become apparent from the following more detailed description, taken in conjunction with the accompanying drawings, which illustrate, by way of example, the principles of the invention. Both the foregoing general description and the following detailed description are explanatory only and are not restrictive of the non-limiting embodiments as claimed.

BRIEF DESCRIPTION OF THE DRAWING(S)

The foregoing Summary as well as the following detailed description will be readily understood in conjunction with the appended drawings which illustrate embodiments of the invention. In the drawings.

DETAILED DESCRIPTION

Exemplary embodiments of the present inventions are depicted in the various drawing figures. Embodiments may be implemented in many different forms and should not be construed as limited to the embodiments described here. Rather, these embodiments are described so that this disclosure will be thorough and complete, and will fully convey the scope of the embodiments to those skilled in the art.

Figure 1:
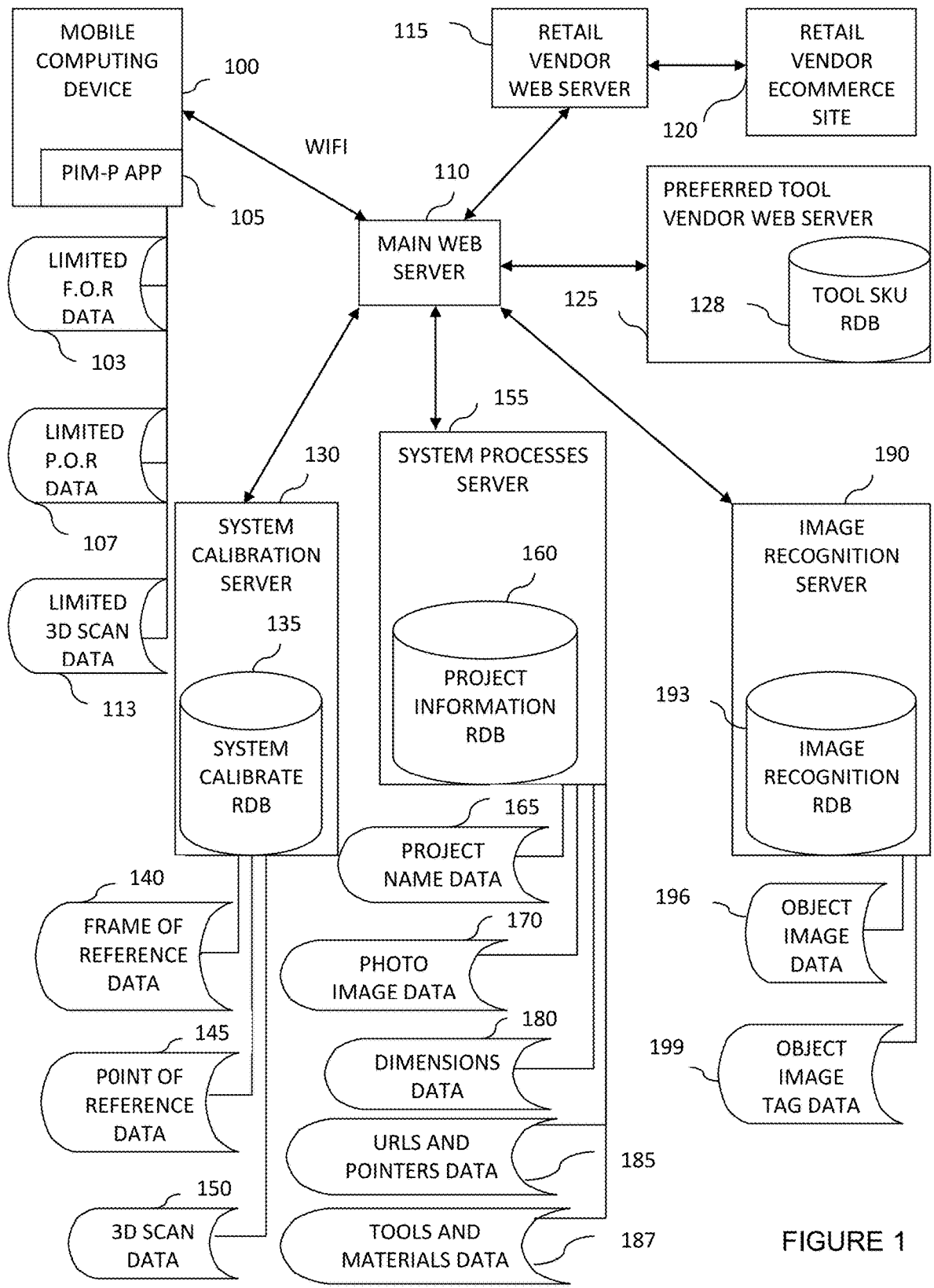
FIG. 1 is a system diagram depicting the system hardware, software and interfaces in accordance with an embodiment of the present invention.

FIG. 1 is a diagram depicting the system hardware and software in accordance with an embodiment of the present invention. A photo imaging and measurement Application 105 (PIM-P Application) operates on a Computing Device 100 which may be a Mobile, Desktop, Laptop, or other CPU device. The Computing Device 100 may comprise an iPhone, iPad, Android phone, Blackberry, Personal Computer, etc., but is not limited to these exclusive examples. The Computing Device 100 communicates with various networked servers via a wireless or hard-wired network interface.

The PIM-P Application 105 may be utilized in either offline mode or online mode. In offline mode, login to and execution of the PIM-P Application 105 occurs on the Computing Device 100. Once the Application 105 is accessed, the default status of the system is "offline." If the choice is made to remain offline, the Application 105 prompts to perform "limited" system calibration local to the mobile/desktop computing device 100, thus producing Limited Frame of Reference Data 103; Limited Point of Reference Data 107; Limited 3D Scan Data 113. In offline mode, images, measurements and data may be collected and stored locally on the Computing Device 100, but cannot be fully processed until the system status enters online mode and the various system servers are accessed. If needed, information stored on the Computing Device 100 may be exported to other computing devices including standard desktop/laptop computing devices in standard file formats including but not limited to .jpg, .xls, .doc, .ppt, .csv, .pdf etc., once the system status is "online."

In online mode login to and execution of the PIM-P Application 105 occurs on the Computing Device 100. Once the PIM-P Application 105 is accessed, the default status of the system is "offline." If the choice is made to go "online," connection to the internet is made through a Main Web Server 110 which receives and directs data and processing requests to the various system servers (130, 155, 190) and relational data bases (135, 160, 193). The PIM-P Application 105, local to the Computing Device 100, is now able to access and integrate with the various system servers (130, 155, 190) and the functional software capabilities. The Application 105 executes on the mobile device, while the remote system servers (130, 155, 190) function as a Software as a Service (SaaS) platform. Once the system status is online, any previously collected and stored calibration data, images, measurements etc. local to the Computing Device 100 will be automatically processed by the appropriate server and joined in the corresponding RDB.

System calibration SaaS processing occurs in the "online" mode, when required data is collected on the Computing Device 100 and relayed to the System Calibration Server 130 via the Main Web Server 110. Data received and processed by the System Calibration Server 130 is then stored in the System Calibrate RDB 135 according to the calibration process used: either Frame of Reference 140; Point of Reference 145; or 3D Scan 150.

System processes and calculations (SaaS processing) occur in the "online" mode, when required data is collected on the Computing Device 100 and relayed to the System Processes Server 155 via the Main Web Server 110. Project Name 165, Photo Image 170 and Dimension measurements 180 are processed by the System Processes Server 155 and then stored along with Project Guide URLs 185 and Tools and Materials 187 in the Project Information RDB 160.

On completing the initial processing of Project Information above, the system notifies the PIM-P Application 105 locally on the Computing Device 100 to select a Project Guide. The System Processes Server 155 points to the URLs 185 in the Project Information RDB 160 and displays in the PIM-P Application 105 on the Computing Device 100, the list of Project Guide "How To" video links that correspond to the Project Name Data 165 and Photo Image Data 170. Selecting a Project Guide link from the displayed list accesses the Vendor eCommerce Site 120, via the Main Web Server 110 and the Retail Vendor Web Server 115 in order to view the Project Guide video. At this point, the Retail Vendor eCommerce Site 120 remains visibly open and accessible to the user while other system processes are carried out by the other remote SaaS functions.

A Project Guide "How To" video is selected and confirmed in the Application 105, for processing use. The selection of a Project Guide video prompts the system to calculate tools and materials quantities. The prompt is sent via the Main Web Server 110 to the System Processes Server 155. Based on the Project Guide video selected, the System Processes Server 155 retrieves the project Dimensions 180 and the recommended Tools and Materials 187 from the Project Information RDB 160 to calculate required project Tools and Materials 187 quantity lists. The Required Tools 187 list prompts the System Process Server 160 to access the Preferred Tool Vendor Web Server 125 and Tool SKU RDB 128 via the Main Web Server 110 to retrieve and display in the Preferred Tool Vendor products matching the Required Tools 187 list, in the Application 105 on the Computing Device 100.

Required Tools and Materials are now selected for purchase on the Retail Vendor eCommerce Site 120 in standard "Shopping Cart" and "Checkout" format.

Image Recognition SaaS processing occurs in the "online" mode, when required image and tag data are collected on the Computing Device 100 and relayed to the Image Recognition Server 190 via the Main Web Server 110. An Object Image 196 and Object Image Tag 199 are processed by the Image Recognition Server 155 and Image Recognition software then joined in the Image Recognition RDB 193.

Figure 2A:
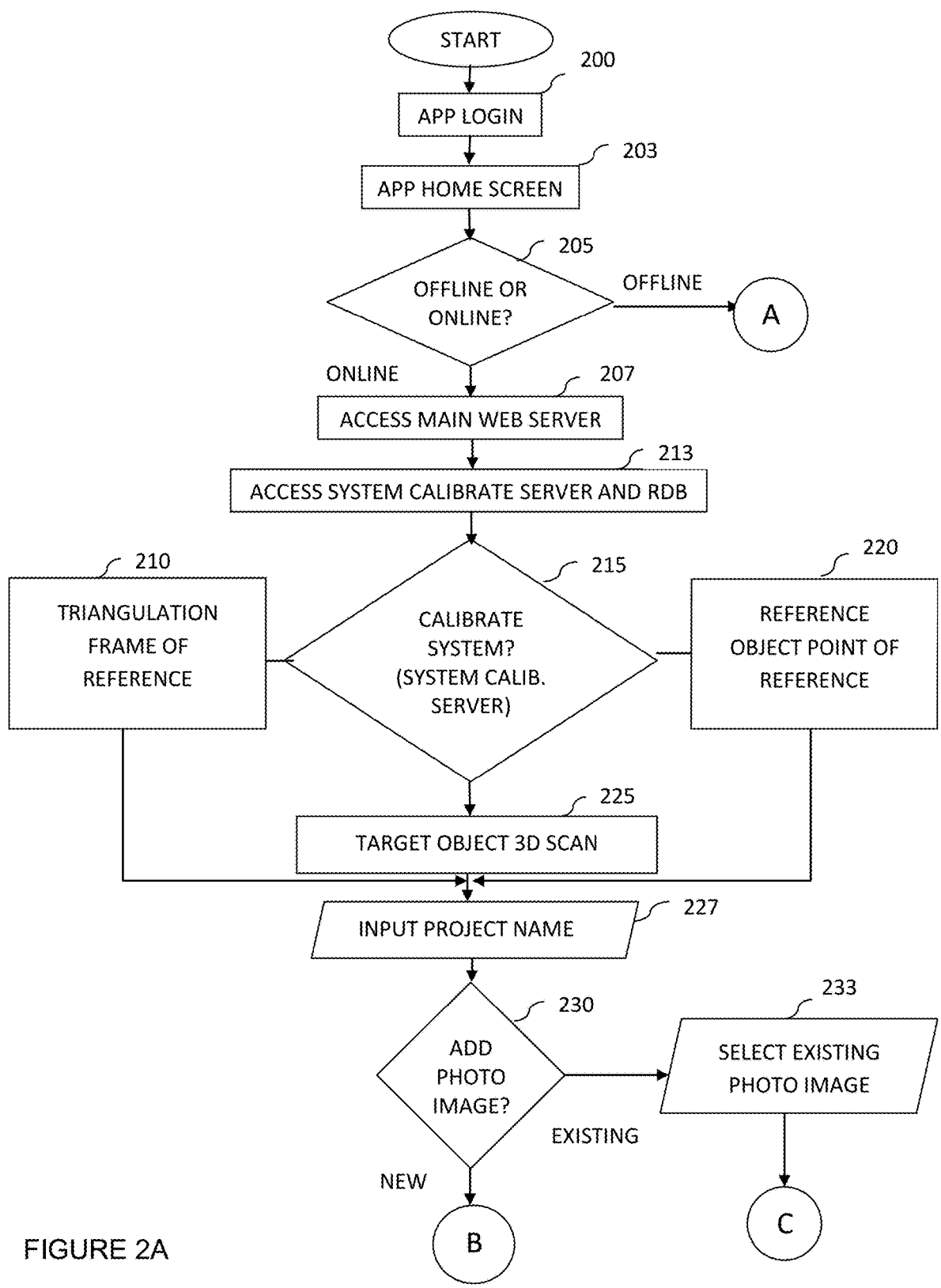
FIG. 2A is a flowchart of a photo imaging and measurement application in accordance with an embodiment of the present invention.

FIG. 2A illustrates a flowchart of the photo imaging and measurement application. In step 200, the user logs in with user name and password to the PIM-P user interface application 105 executing on the Computing Device 100. In step 203, after user login, the PIM-P application 105 Home screen appears.

In step 205, the Home screen presents the option to Go Online (Yes or No). Default is off-line. If Online is selected, processing continues at step 207. If Offline is selected, processing continues at connector A. At step 207, the Main Web Server 110 is accessed. In step 213, The Main Web Server 110 (FIG. 1), automatically passes control to the System Calibration Server 130 (FIG. 1) and System Calibrate RDB 135 (FIG. 1) to perform one or more selected System Calibration procedure(s) (210, 220, 225). In some embodiments, the User may choose one System Calibration procedure (210, 220, 225). In other embodiments, the User may utilize a combination of System Calibration procedures (210, 220, 225). At step 215, the User chooses the system calibration procedure(s) (210, 220, 225).

In step 210, the System Calibration Server 130 performs System Calibration by Triangulation Frame of Reference 210. In step 220, the System Calibration Server 130 performs System Calibration by Reference Object Point of Reference 220. In step 225, the System Calibration Server 130 performs System Calibration by Target Object 3D Scan 225.

In step 227, on completion of System Calibration, the Application 105 returns to the PIM-P Application 105 Home screen to input the Project Name. Saving the Project Name sends information top the System Processes Server 155 (FIG. 1) and Project Information RDB 160 (FIG. 1). In step 230, on completion of Project Name, a photo image of the project is then added by either Capture New Photo Image 240 (FIG. 2B) or else Select Existing Photo Image 233.

Figure 2B:
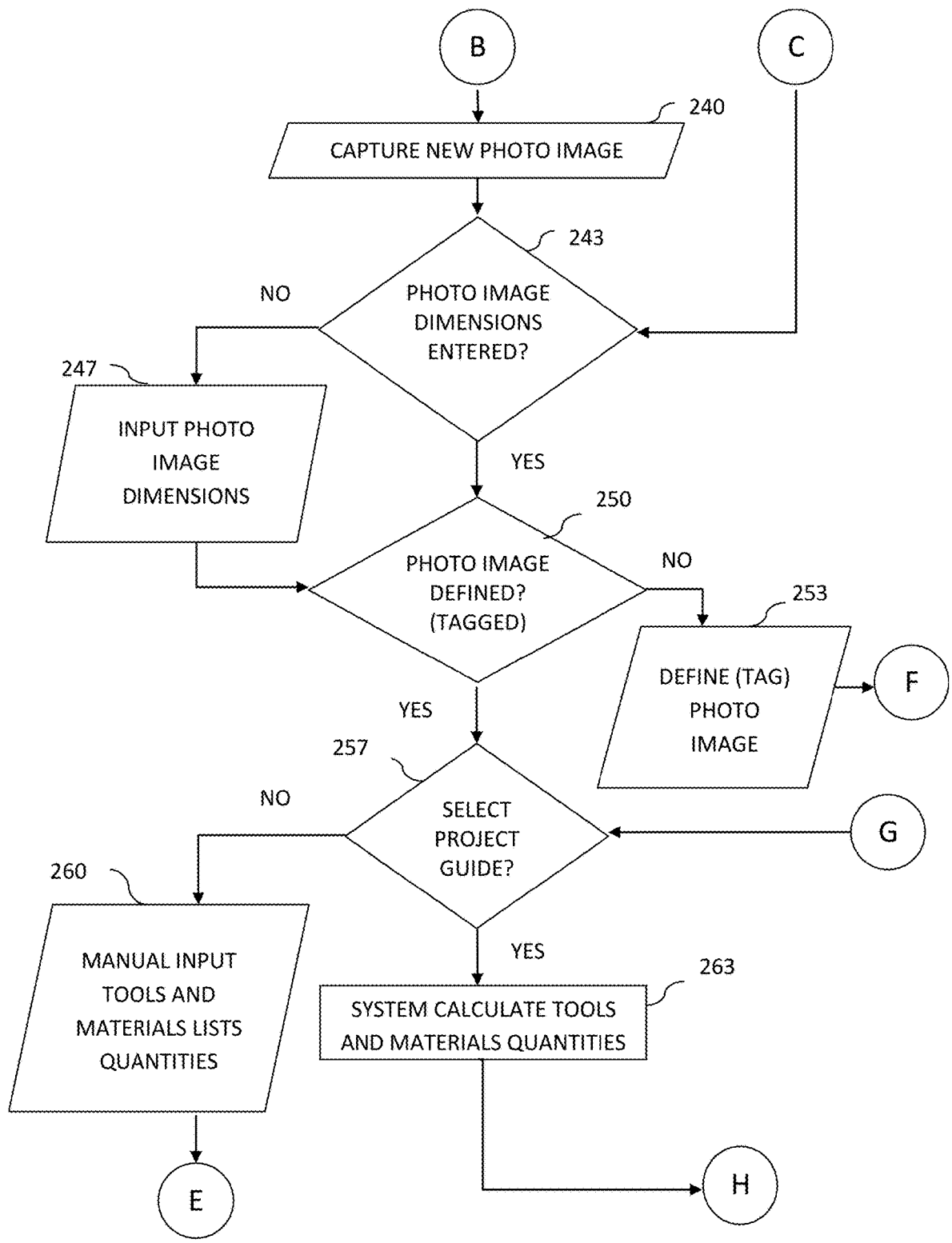
FIG. 2B is a flowchart of a photo imaging and measurement application in accordance with an embodiment of the present invention.

Referring to FIG. 2B, in step 240, a new photo image is captured and saved, and processing continues at step 243. A photo image may be captured by various devices including but not limited to a camera device intrinsic to the System Mobile Device 100, another mobile device such as a cellular phone or a computing tablet, a camera device independent of the disclosed system hardware, or a scanning device which is independent of the disclosed system hardware. The photo image may be transferred to the system Mobile Computing Device 100 by multiple methods including but not limited to; standard wireless or wired Internet connectivity, standard device-to-device direct wireless or hardwired connectivity. The new photo image is saved to the System Processes Server 155 (FIG. 1) and Project Information RDB 160 (FIG. 1).

In step 233, an existing photo image is selected. If Select Existing Photo is chosen, the photo may be selected from a local file on the mobile computing device, or selected from the System Processes Server 155 (FIG. 1) and Project Information RDB 160 (FIG. 1). Processing now continues at step 243 (FIG. 2B).

In FIG. 2B, (step 243), once a photo image is selected, the Application 105 determines if the Photo Image Dimensions are entered. If the Photo Image Dimensions are entered, then the Application continues at step 250. If the Photo Image Dimensions are not entered, the Application 105 proceeds to step 247. In step 247, Photo Image Dimensions are inputted by selecting a dimension to be measured from a User Interface, then touching a display and "drawing" the length of the dimension being measured. The user may perform multiple touches around the perimeter of a hole or curved object, and then connect the touch points by drawing between them. This will identify to the system that the object being measured is other than a straight line. Completing and saving the image dimensions sends the information to the System Processes Server 155 (FIG. 1) and Project Information RDB 160 (FIG. 1).

In step 250, after completing dimensions capture, from the Home screen, the image will be defined. If Photo Image is defined, the Application 105 proceeds to step 257. If Photo Image is not defined, the Application proceeds to step 253. In step 253, Define Photo Image means something like "hole" for a hole in a wall or "P-trap" for the plumbing trap under a sink. This Photo Image definition also tags the image for use by the Image Recognition Server 190 (FIG. 1) and Image Recognition RDB 193 (FIG. 1). The defined photo is saved as Photo Image Data 170 in the Project Information RDB 160 (FIG. 1). Once the Photo Image has been defined, the Application 105 proceeds through connector F. Saving the image definition sends the information to the Image Recognition Server 190 (FIG. 1) and the Image Recognition RDB 193 (FIG. 1) via connector F as well as the System Processes Server 155 (FIG. 1) and Project Information RDB 160 (FIG. 1).

Figure 2C:
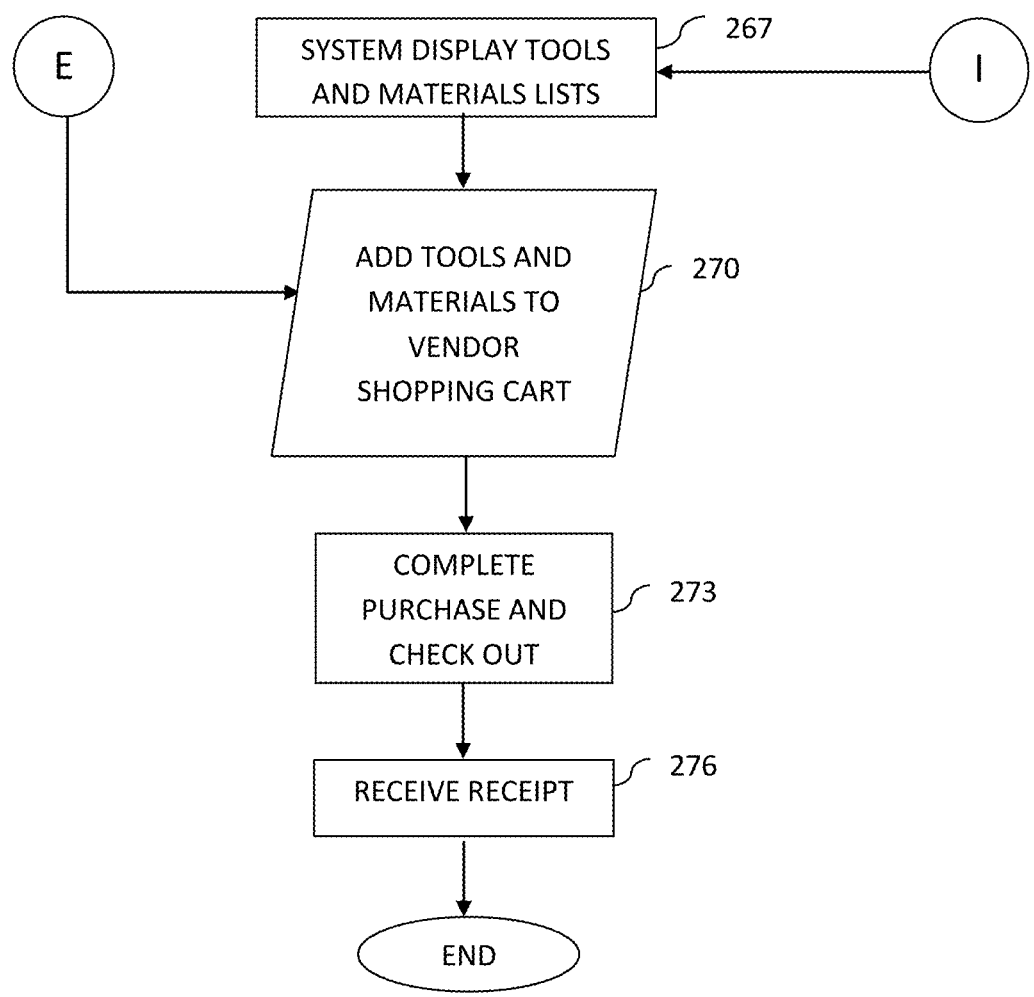
FIG. 2C is a flowchart of a photo imaging and measurement application in accordance with an embodiment of the present invention.
Figure 2D:
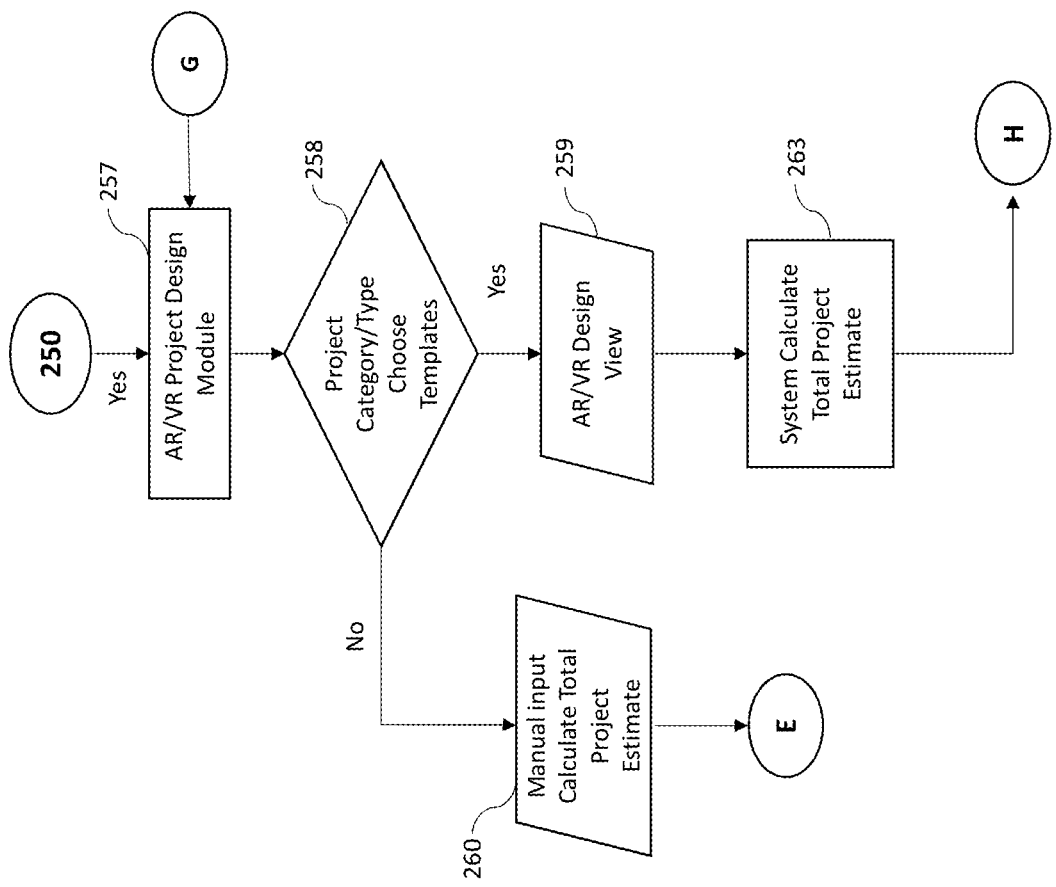
FIG. 2D is a flowchart of a photo imaging and measurement application in accordance with an embodiment of the present invention.

Referring to FIG. 2D, in step 257, if the Photo Image is defined, the Application 105 prompts the user to enter an Augment Reality (AR) and/or Virtual Reality (VR) Project Design Module (referred to at times throughout as, "AR/VR Project Design Module"). In response to entering the AR/VR Project Design Module, the Application 105 inputs the Photo Image and Photo Image Dimensions and retrieves information stored in Project Information RDB 160 (FIG. 1) based on the combination of Project Name Data 165 and Photo Image Data 170. In some embodiments, the Photo Image Data is collected within the AR/VR Project Design Module and the photo image data may comprise a live or recorded video stream displayed on a touch enabled mobile computing device. The Application 105 may retrieve information that includes, for example, home improvement project templates, project "How To" guides, and Project Guide URL links 185. In response to retrieving information based on Project Name Data 165 and Photo Image Data 170, the Application 105 may display the retrieved information on Mobile Computing Device 100. The AR/VR Project Design Module may be configured to enable the user to add one or more design components to the Photo Image—such as, e.g., decor, finishing, and furnishings.

Application 105 may implement any known machine learning capability to recognize and identify design components (component of decor, finishing, and furnishings such as, e.g., furniture, shelving, lamps, and lighting, etc.) from Photo Image Data 170. Application 105 may include a machine-learning algorithm configured to utilize a training data set consisting of text and/or image data associated with a plurality of design components to enable Application 105 to anticipate, guide and facilitate the design process. Application 105 may include a machine-learning algorithm such as, but not limited to, k-nearest neighbor, naive Bayes classifier, decision tree, linear regression, support vector machines, and neural networks. Application 105 may include a machine-learning algorithm configured to utilize a training data set consisting of a plurality of project categories assigned to a plurality of images of design components. Application 105 may include a machine-learning algorithm configured to analyze one or more geometric features of an image of a design component. For example, the Application 105 may employ Point Cloud (PC) data to render and display one or more three-dimensional (3D) models of design components in Design View of step 259. Application 105 may include a natural language processing (NLP) machine-learning algorithm configured to analyze a plurality of Project Templates to determine commonalities between each Project Template. Application 105 may include a NLP machine-learning algorithm configured to condense a plurality of Project Templates into a generated Project Template.

In step 258, after entering the AR/VR Project Design Module, the Application 105 may prompt the user to select a Project Category derived from a plurality of Project Templates. The Project Category may include a broad category of home improvement projects. The Project Category may include a Project Type that is a sub-category of home improvement projects. In response to selecting a Project Category and a Project Type, the Application 105 displays one or more available Project Templates on the Mobile Computing Device 100. A Project Template may indicate various aspects of the selected Project Category and Project Type necessary to complete the selected project—such as, e.g., methods, tools, materials, time requirements, skills, etc., required to complete a home improvement project in a respective Project Template. Project Templates may be accessible via one or more third-party resources—such as, e.g., Retail Vendor eCommerce Site 120, or a home improvement project website. For example, the user may select a Project Category of "kitchen" and a Project Type of "cabinets," to display a plurality of kitchen cabinet Project Templates. The user may select a kitchen cabinet Project Template that is suitable for the user's needs. If a Project Template is selected, the Application 105 proceeds to step 259. If a Project Template is not selected, the Application 105 proceeds to step 260 to manually calculate a total project estimate.

In step 260, if a Project Template is not selected, the user is prompted to manually calculate a total project estimate. The total project estimate based, at least in part, on calculations external to the system that include anticipated tools and material entered by the user and saved to the system. Manually entered information saved to the system in step 260 may be sent to the System Process Server 155 (FIG. 1) and the Project Information RDB 160 (FIG. 1). Application 105 subsequently proceeds through connector E.

In step 259, after selecting the Project Template, the user is prompted to access a Design View based on the Project Category and Project Template selected. Design View may include the user interacting with a touch-enabled user interface of Mobile Computing Device 100 by performing one or more touch events (e.g., click, drag, drop, etc.) on one or more design components (e.g., decor, finishing, furnishings, etc.). Design View may include one or more design components selected from the Project Template, a retail vendor digital catalogues, websites, or other source that includes image data associated with a respective design component. Design View may include displaying one or more design components as a list on Mobile Computing Device 100. Design View may include the user interacting with digital representations of one or more design components, and inserting one or more design components into the Photo Image. Design View may include using a graphical processing unit (GPU) stored at a first location to render digital representations of one or more design components and stream the image to a Mobile Computing Device 100 at a second location different from the first location. Design View may include using ray tracing to render digital representations of one or more design components. Design View may include generating a list of one or more design components inserted into the project image. Design View may include using a generated list of one or more design components to create an ecommerce shopping cart accessible to the user.

In step 263, after designing the project in Design View, the Application 105 prompts the System Processes Server 155 (FIG. 1) to calculate a total project estimate of the construction project. The calculated total project estimate may include the cost of one or more of the following: tools, materials, décor, finishing, furnishings, design components, time requirements, etc. The calculated total project estimate may include the cost of one or more design components utilized in Design View. The total project estimate may include calculating the cost of each design component utilized in Design View. The total project estimate may include calculating the cost of each design component from a plurality of vendors and comparing the cost of each design component from each vendor. Application 105 subsequently proceeds through connector H.

Referring to FIG. 2C, the Application enters step 267 from connector I, or else it enters step 270 from connector E. In step 267, the Application 105 displays system-calculated materials and preferred tools lists. In step 270, using the system-calculated materials and tools requirements or the manually entered tools and materials list, the System Process Server 155 (FIG. 1) directs the Main Web Server 110 (FIG. 1) to the Retail Vendor Web Server 115 (FIG. 1) and Retail Vendor eCommerce Site 120 (FIG. 1). Tools and materials are selected and added to the Shopping Cart 270 and Checked Out 273, on the Retail Vendor eCommerce site 120 (FIG. 1). The purchase is completed using an appropriately aligned Vendor Credit account or an independent Credit Card. The project is then saved on the Mobile Computing Device 100, and Project Information Server 160. In step 276, an electronic receipt is transmitted from the Vendor eCommerce site 120. The Application 105 main system process now ends. The Application 105 main system process now ends.

Figure 3:
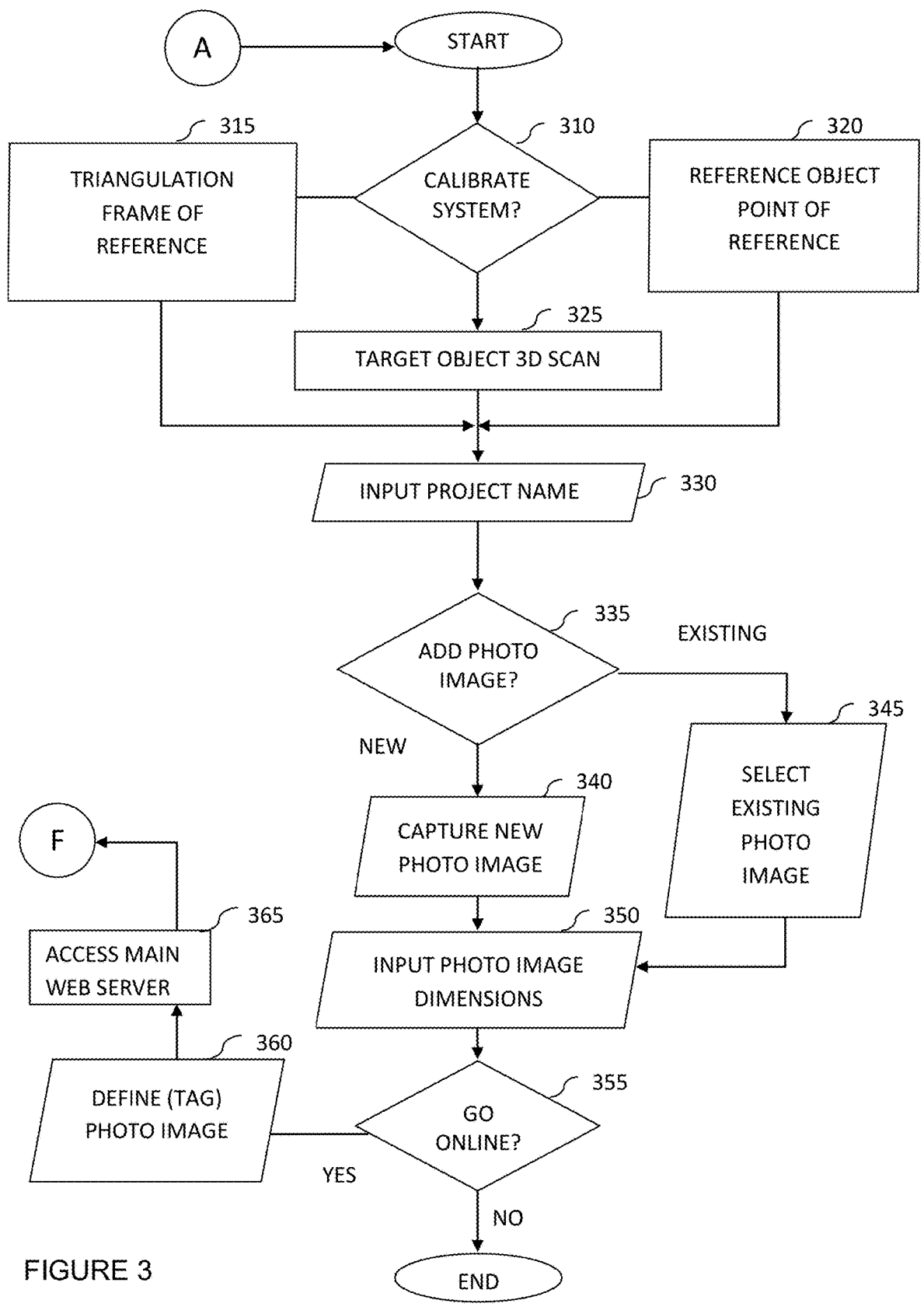
FIG. 3 is a flowchart of a photo imaging and measurement application in accordance with an embodiment of the present invention.

Referring to FIG. 3, the Application 105 flow enters from connector A while in Off-line mode. In step 310, while Off-line, the PIM-P Application 105 provides limited calibration capability, local to the Computing Device 100 (steps 315, 320, 325). At step 310, the User chooses one or more system calibration procedures (steps 315, 320, 325). In step 315, the Application 105 performs limited System Calibration by Triangulation Frame of Reference 103 (FIG. 1). In step 320, the Application 105 performs limited System Calibration by Point of Reference object 107 (FIG. 1). In step 325, the Application 105 performs limited System Calibration by Target Object 3D Scan. 113 (FIG. 1). In step 330, on completion of limited System Calibration, the Application 105 returns to the Application 105 home screen (FIG. 1) to input a Project Name.

In step 335, on completion of Project Name input (step 330), a photo image of the project is then added from a limited source file on the Computing Device 100. The User may select an existing image (step 345) or else capture a new photo image (step 340). In step 340, the User captures a new photo image. A photo image may be captured by, but not limited to; a camera device which is intrinsic to the System Mobile Device 100 or other mobile device such as a cellular phone or computing tablet; a camera device which is independent of described system hardware or a scanning device which is independent of described system hardware. The photo image may be transferred to the system Mobile Computing Device 100 by way of but not limited to; standard wireless or hardwire internet connectivity; standard device-to-device direct wireless or hardwired connectivity. The Application 105 then proceeds to step 350. In step 345, the User selects an existing photo image. If Select Existing Photo is chosen, the photo may be selected from a local file on the Computing Device 100 only. The Application 105 proceeds to step 350. In step 350, the User inputs Photo Image Dimensions by selecting the dimension to be measured from a user interface, then touching a Computing Device 100 screen and "drawing" the length of the dimension being measured. The User may first touch multiple points around the perimeter of a hole or curved object, then connect the touch points by drawing between them. This will identify to the system that the object being measured is other than a straight line. These dimensions will be saved locally on the Computing Device 100 until the Computing Device 100 is connected online to the System Processes Server 155 (FIG. 1) and Project Information Database 160 (FIG. 1).

In step 355, the User is prompted to Go Online. If "no" is answered, then the operation ends, project information is saved locally, and the Application 105 returns to the Home screen. If "yes" is answered, the Application proceeds to step 360. In step 360, Define Photo Image is a forced command. This means that no further processing will occur online until the project image has been defined as outlined previously in step 253.

Figure 4:
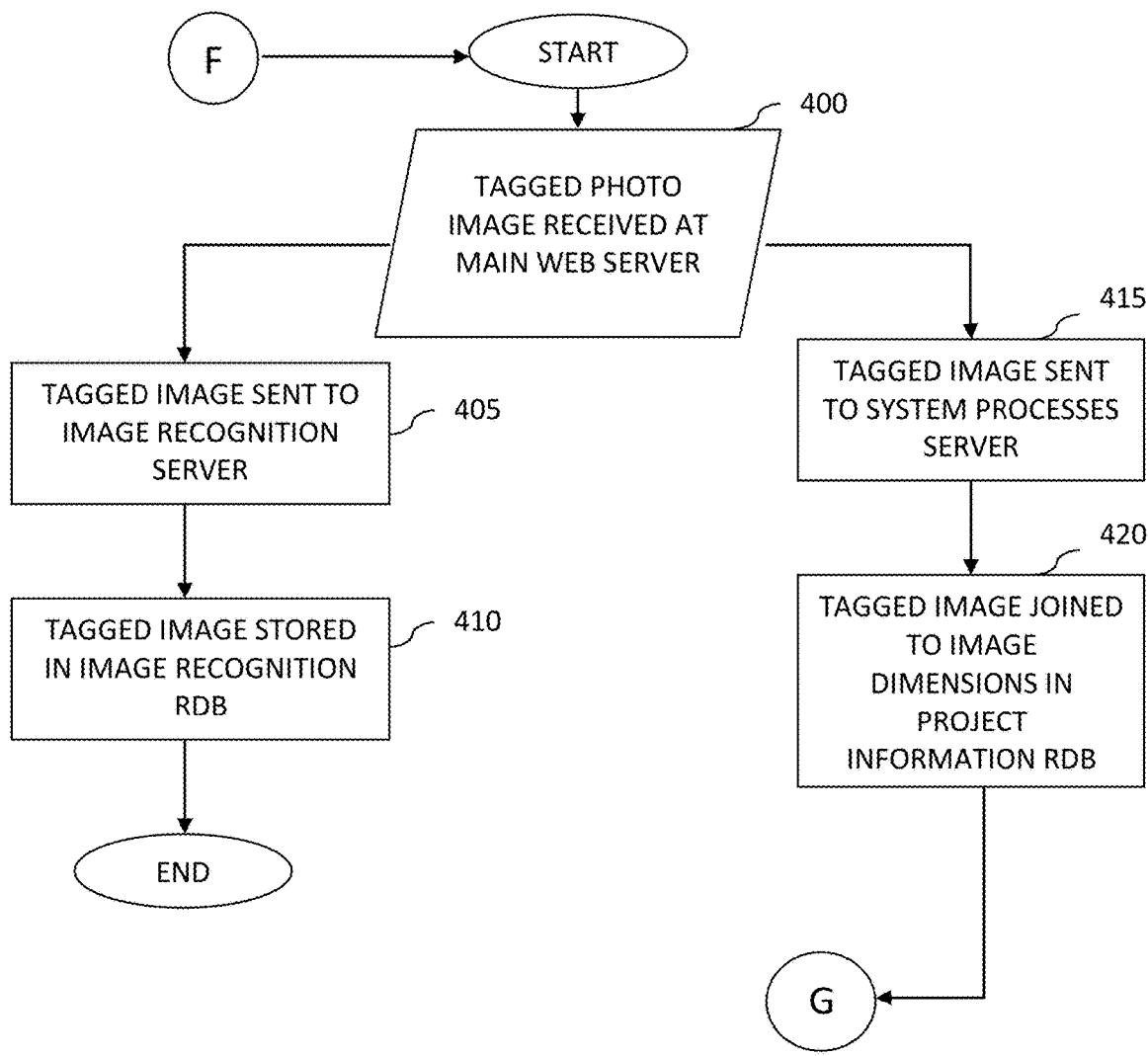
FIG. 4 is a flowchart of a photo imaging and measurement application in accordance with an embodiment of the present invention.

In step 365, once an image is defined Sub-process A (FIG. 3) completes. The Main Web Server is now accessed and enters Sub-process F (FIG. 4). Sub-process F accesses both the Image Recognition Server 190 (FIG. 1) and the Image Recognition RDB 193 (FIG. 1) as well as the System Processes Server 155 (FIG. 1) and Project Information RDB 160 (FIG. 1).

Referring to FIG. 4, step 400 may be entered from either step 253 (FIG. 2B) or else from step 365 (FIG. 3, Sub-process A). The defined (tagged) Photo Image is received at the Main Web Server 110 (FIG. 1). The Main Web Server identifies the tagged Photo Image data (196, 199), and forwards it to the Image Recognition Server 190 (FIG. 1) and the Image Recognition RDB 193 (FIG. 1) for processing and storage by Image Recognition software (steps 405, 410). The Main Web Server also forwards the tagged Photo Image to the System Processes Server 155 (FIG. 1) for project processing (steps 415, 420). Image dimensional calculations are stored with other related project data in the Project Information RDB 160 (FIG. 1).

In step 405, the tagged Photo Image is identified and processed by Image Recognition software. The tagged Photo Image is then stored in the Image Recognition RDB 193 (step 410). This builds the Image Recognition RDB 193 for future improvement and "smart" system functionality via Image Recognition software capabilities.

In step 415 the tagged Photo Image is sent to the System Processes Server 155 (FIG. 1) where name, definition and dimensional details are processed and stored for further calculation. In step 420, the tagged Photo Image is stored and joined with Project details in the Project Information RDB 160, including Name Data 165, Image Data 170, and Dimensions Data 180 (FIG. 1). Once the System Processes Server 155 image processing is complete, Sub-process A completes and exits from connector G and enters the main system flow from connector G at step 257 (FIG. 2B).

Figure 5:
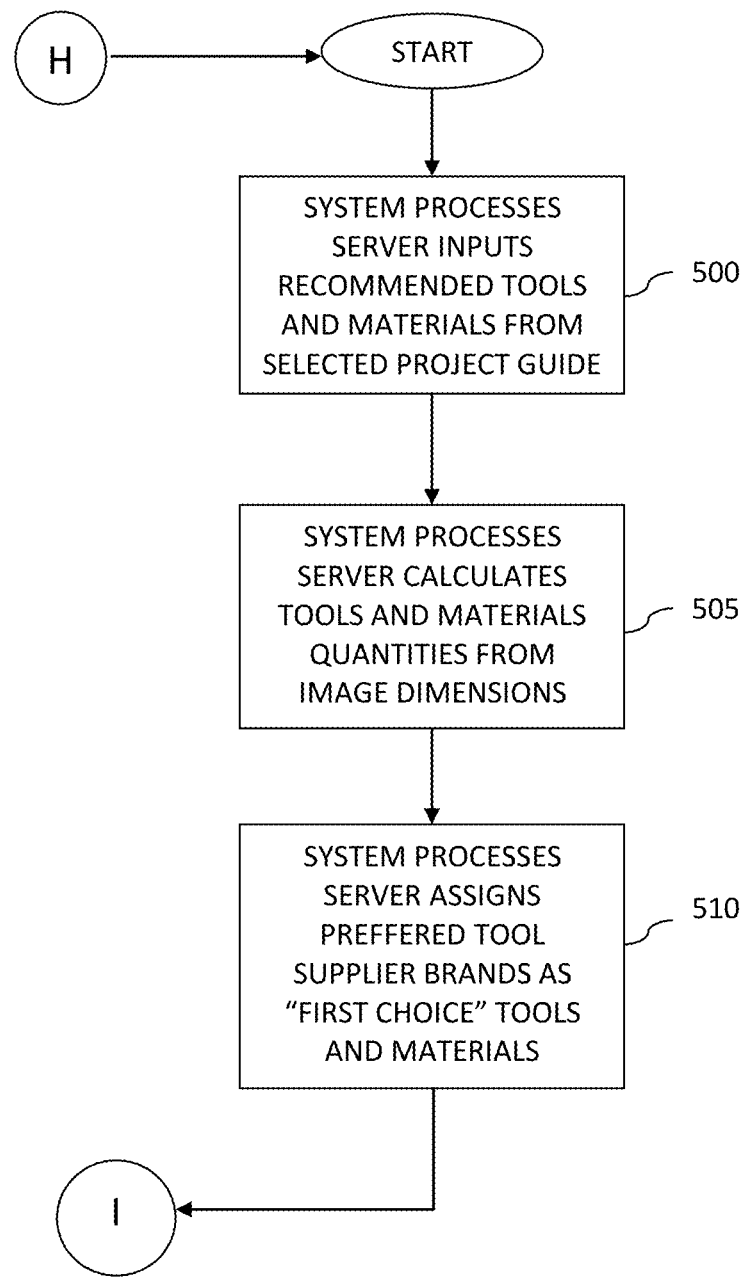
FIG. 5 is a depiction of a photo imaging and measurement application in accordance with an embodiment of the present invention.

Referring to FIG. 5, the Application 105 enters from connector H into step 500. In step 500 the System Processes Server 155 (FIG. 1) retrieves recommended tools and materials posted in the selected Project Guide video. In step 505 the System Processes Server 155 (FIG. 1) retrieves project Dimensions Data 180 from the Project Information RDB 160 (FIG. 1) and calculates anticipated tools and materials quantities based on selected Project Guide recommendations and actual project measurements. In step 510, based on a recommended tools list, the System Processes Server 155 (FIG. 1) accesses the Preferred Tool Vendor Web Server 125 (FIG. 1) and the Tool SKU RDB 128 (FIG. 1) to retrieve and list Preferred Tool Vendor products matching recommended items. When Sub-process H is complete, it re-enters the main system through connector I at step 267 (FIG. 2C).

In some embodiments, Application 105 executes a machine learning (ML) algorithm configured to identify home improvement design solutions based on visual data selected by a user via Mobile Computing Device 100. The term "visual data" (also referred to as a "visual data portfolio") may include an image, plurality of images, video, or plurality of videos, collected via a sensor (e.g., a camera). The ML algorithm may identify home improvement design solutions based on one or more attributes of visual data selected by the user—such as, e.g., calculated dimensions of an area to be renovated, identified design components, internet browser metadata, color schemes, styles, or user feedback. The ML algorithm may derive from a training data set that includes a plurality of tagged images stored in Image Recognition RDB 193. Each image of a training data set may include metadata tags assigned by a user, one or more properties identified by Image Recognition Software, and/or third-party data associated with a given image. In response to executing a ML algorithm on visual data selected by a user, Application 105 may display one or more design components in an augment reality (AR) or virtual reality (VR) environment via Mobile Computing Device 100—e.g., Application 105 may display one or more design components in Design View of step 259. In response to executing a ML algorithm on visual data selected by a user, Application 105 may generate a three-dimensional (3D) digital representation of a design component based on one or more properties of the design component and a pre-built 3D model scaffold.

In some embodiments, Application 105 generates a panoramic display based on collected visual data of a given area. The panoramic display may include merging two or more images to yield a single image that depicts aspects of a given area captured by the two or more images. The panoramic display may include measurements of one or more aspects of a given location captured via a camera of a mobile computing device in response to a user interaction with a touch enabled display of the mobile computing device.

In some embodiments, Application 105 executes a machine learning (ML) algorithm configured to identify home improvement design solutions based on a projected increase in value yielded by a home improvement project. The ML algorithm may derive from a training data set that includes real property market data—such as, e.g., historical property transactions, historical features and/or design components, etc. The ML algorithm may derive from a training data set that includes text and/or visual data of one or more online real property listings. The ML algorithm may identify the addition or removal of one or more design components from a given property over time based on design components identified by image recognition software. The ML algorithm may identify a correlation between one or more design components and change in property value via hidden layers of a neural network.

In some embodiments, Application 105 executes a machine learning (ML) algorithm configured to identify home improvement design solutions for a first location of a home based, at least in part, on visual data collected from a second location of the home. For instance, the ML algorithm may identify design components, décor, etc., (i.e., themes) of a first location not under renovation to determine one or more complementary design components for a home improvement project of a second location. Executing the ML algorithm may include, for example, a user collecting visual data of a first room and visual data of a second room via a camera. For example, a user captures images of a first room (Room A) and a second room (Room B) of a residential home using a mobile computing device. The user identifies Room A as a kitchen under renovation, and identifies Room B as a living room that is not under renovation. Application 105 executes a ML algorithm on the captured images of Room A and Room B. The ML algorithm identifies two design components of Room B: a leather couch and a mahogany coffee table. The ML algorithm utilizes a training data set to determine complementary components for Room A based on the identified design components of Room B. Application 105 displays one or more complementary design components suggested to include in Room A for the user to engage in an AR environment via the mobile computing device.

In some embodiments, Application 105 executes a machine learning (ML) algorithm configured to identify progression of a home improvement project over time. The ML algorithm may analyze progression of a home improvement project to provide feedback and/or suggestions to a user based on discrepancies between a first image captured at a first point in time, a second image captured at a second point in time, and/or a projected image based on an augmented reality (AR) design created by the user in Design View. In response to identifying a discrepancy, Application 105 may notify a user of the discrepancy and may provide suggestions to remedy the discrepancy. For example, a user engages in a home improvement project that includes installing kitchen cabinets. The user captures a first image of the kitchen at a first point in time (e.g., start of project), a second image of the kitchen at a second point in time (e.g., middle of project), and a third image of the kitchen at a third point in time (e.g., end of project). In the first image at the first point in time, the user has not modified the kitchen and enters Design View displayed on a Mobile Computing Device to engage digital representations of kitchen cabinets to design the kitchen in an augmented reality environment. While in Design View, the user selects kitchen cabinets that include a first cabinet and a second cabinet requiring separate installation. Between the first and second point in time, the user installs the first cabinet and proceeds to capture the second image of the kitchen. Application 105 executes a ML algorithm on the second image to identify discrepancies based on the first image, second image, and a projected image created in Design View. In response to identifying a discrepancy, such as the first cabinet being misaligned with the position selected in Design View, the Application notifies the user of the discrepancy and provides suggested solutions to remedy the discrepancy.

In some embodiments, Application 105 executes a natural language processing (NLP) algorithm configured to process a plurality of project guides in which each project guide is associated with a project category of a plurality of project categories. The NLP algorithm may implement part-of-speech tagging (POS tagging) to associate one or more discreet terms of each project guide with one or more descriptive tags. Descriptive tags may include one or more aspects associated with a home improvement project—such as, e.g., materials, tools, online vendors, cost estimates, labor estimates, etc. The NLP algorithm may cross-reference two or more project guides associated with a respective project category to identify commonalities and/or differences between the two or more project guides of the respective project category. The NLP algorithm may generate a project template based on identified commonalities and/or differences of two or more project guides associated with a respective project category. The NLP algorithm may generate a project template that includes two or more alternatives to an aspect of the home improvement project based, at least in part, on identified differences. The NLP algorithm may calculate a confidence score associated with the accuracy of one or more descriptive tags assigned to one or more discreet terms within a project guide.

Figure 6:
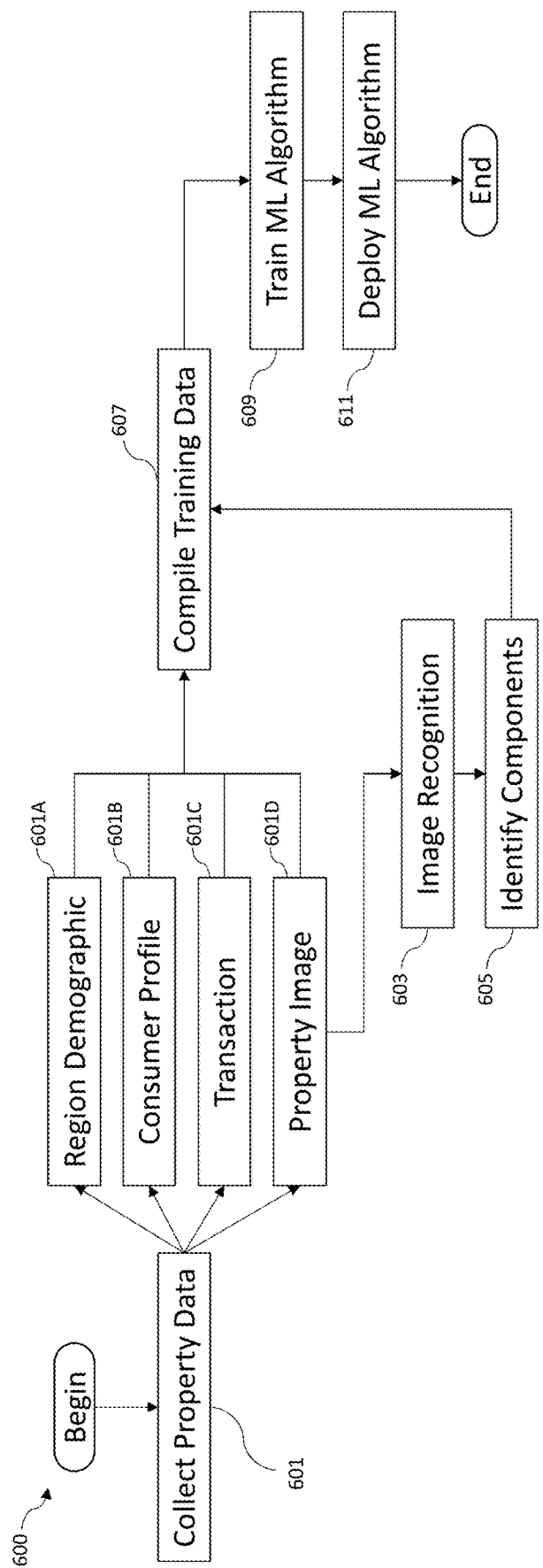
FIG. 6 is a flow chart of a machine learning feature in accordance with an embodiment of the present invention.

Referring to FIG. 6 depicting a method 600 of training a machine learning algorithm based on real property data 601. The method 600 starting with collect property data in step 601. Collecting property data in step 601 may include obtaining historical data sets associated with real estate listings and attributes of each listing such as, for example, region demographic 601A, consumer profile 601B, transaction 601C, and property image 601D. Image recognition in step 603 includes executing a function on property image 601D of each item in collected property data 601 to identify components 605. Subsequently, compile training data 607 includes assembling the identified components 605, region demographic 601A, consumer profile 601B, transaction 601C and property image 601D into a training data set 607 to train a machine learning algorithm. The compiled training data 607 trains machine learning (ML) algorithm 609 to generate a ML algorithm capable of deriving properties and suggestions for future home improvement projects. Finally, deploy ML algorithm 611 includes enabling the Application 105 to programmatically access the ML algorithm to execute functions on a user's visual data.

Figure 7:
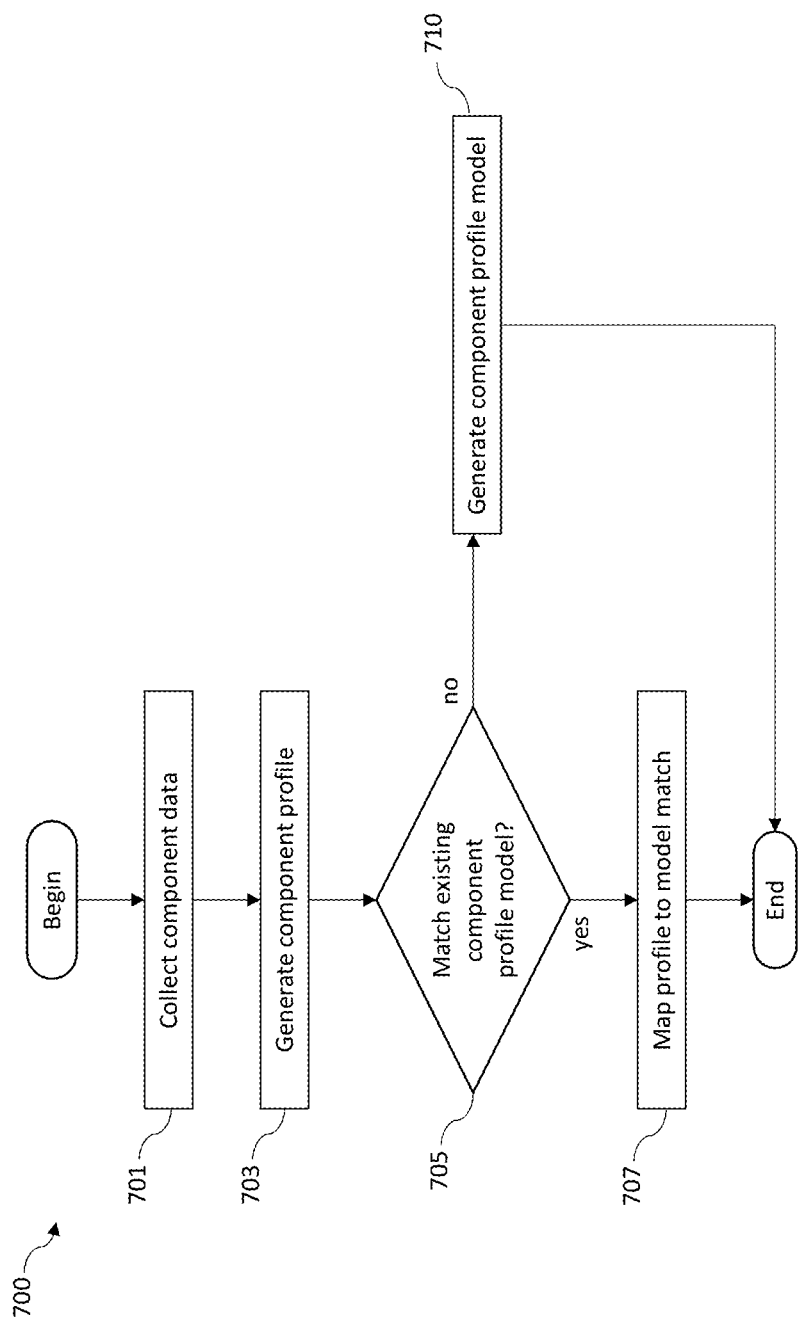
FIG. 7 is a flow chart of a machine learning feature in accordance with an embodiment of the present invention.

Referring to FIG. 7, depicting a method 700 in accordance with an embodiment of the present invention. Collect component data in step 701 includes compiling home improvement design components from one or more vendors. Generate component profile in step 703 includes identifying attributes of the design component and compiling the attributes into a machine-readable format (e.g., JSON, XML, etc.). Match existing component profile model in step 705 compares attributes of the component profile yielded in step 703 to determine if a three-dimensional (3D) computer-animated design (CAD) model of a different design component exists in a database. If a matching 3D CAD model does exist, the method 700 proceeds to map profile to model match in step 707 that applies an attribute mesh (e.g., color of the component) to a pre-existing 3D CAD model. If a matching 3D CAD model does not exist, the method 700 proceed to generate a 3D CAD model based on the generated component profiled yielded in step 703.

Figure 8:
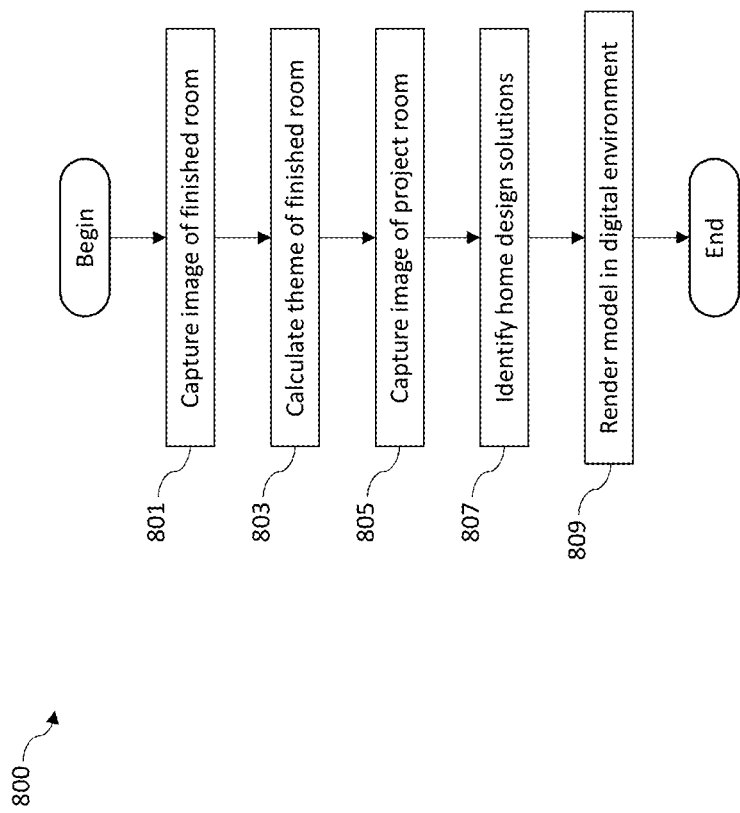
FIG. 8 is a flow chart of a machine learning feature in accordance with an embodiment of the present invention.

Referring to FIG. 8, depicting a method 800 in accordance with an embodiment of the present invention. Capture image of finished room in step 801 includes using a camera on a mobile computing device to collect a first visual portfolio. Calculate theme of finished room in step 803 includes executing a ML algorithm on the first visual portfolio yielded in step 801 to calculate a theme based on one or more design components installed in the finished room. Capture image of project room in step 805 includes using a camera on a mobile computing device to collect a second visual portfolio of a room that is the subject of a home improvement project. Identify home design solutions in step 807 may include executing a ML algorithm on the second visual portfolio to identify one or more design components that match the calculated theme yielded in step 803. Render model in digital environment of step 809 includes displaying the one or more design components yielded in step 807 on a mobile computing device in an augmented reality environment.

Figure 9A:
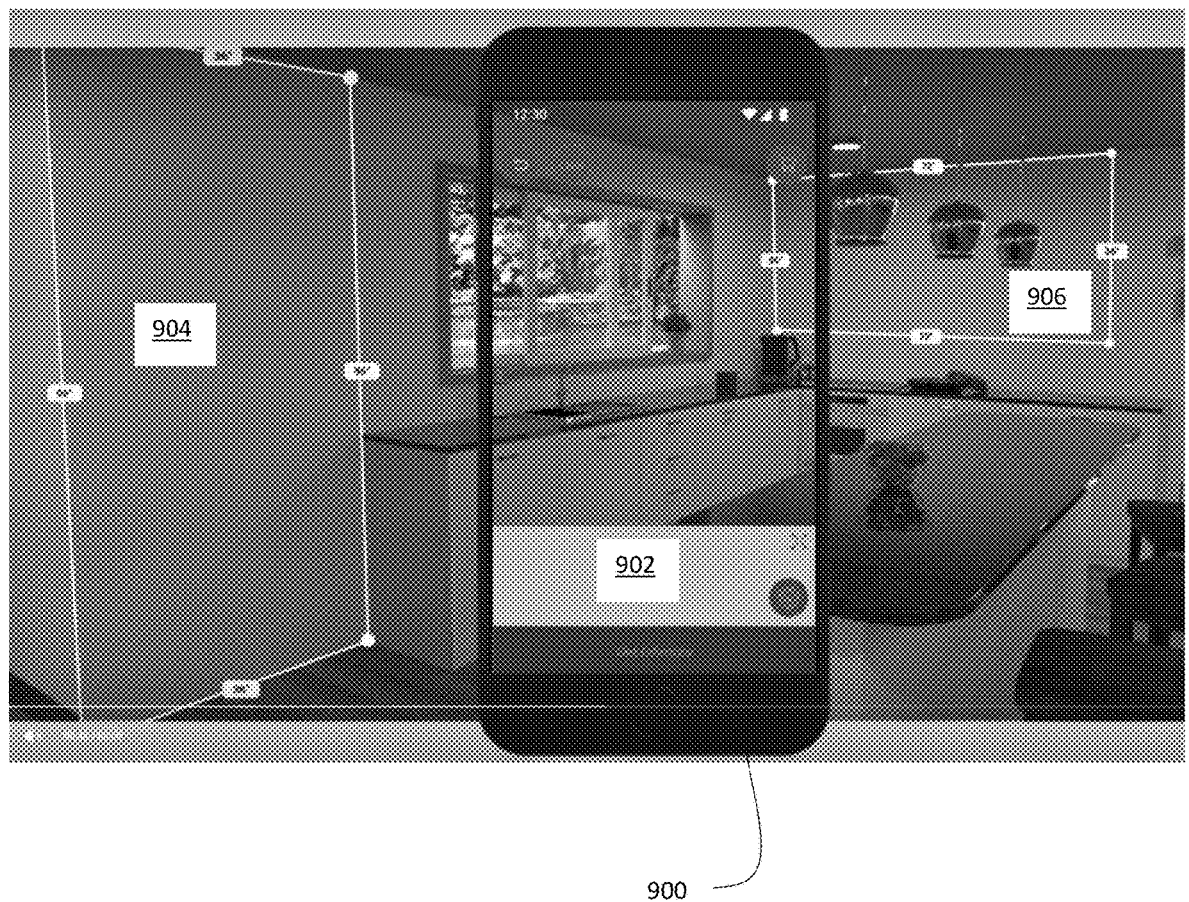
FIG. 9A is a depiction of a photo imaging and measurement application in accordance with an embodiment of the present invention.

Referring to FIG. 9A which includes a depiction of a photo imaging and measurement application in accordance with an embodiment of the present invention. FIG. 9A depicts an embodiment of the present invention that is collecting images of a room in an AR environment 902 in which a touch enabled mobile computing device 900 collects visual data by scanning the room. As the user scans the room, the user is able calculate dimensions of various aspects (i.e., work areas 904,906) of the room, e.g., the dimensions on the wall where cabinets are to be installed. Dimensions may be calculated by pointing the camera at a location and inserting shapes (e.g., a rectangle) onto a surface or selecting points in the AR environment using the touch enabled interface. Once the dimensions of the desired work areas are established, the user can scan around the room via the mobile device see the measured work areas where, e.g., new cabinets are to be installed. (Note that the work areas/dimensions shown outside of AR viewer are for illustrative purposes only—i.e., they would only be seen within the AR environment 902 shown on the device screen. Accordingly, the AR environment is configured to measure and render a set of work areas within a room, which may be captured and stored using panoramic imagery.

Figure 9B:
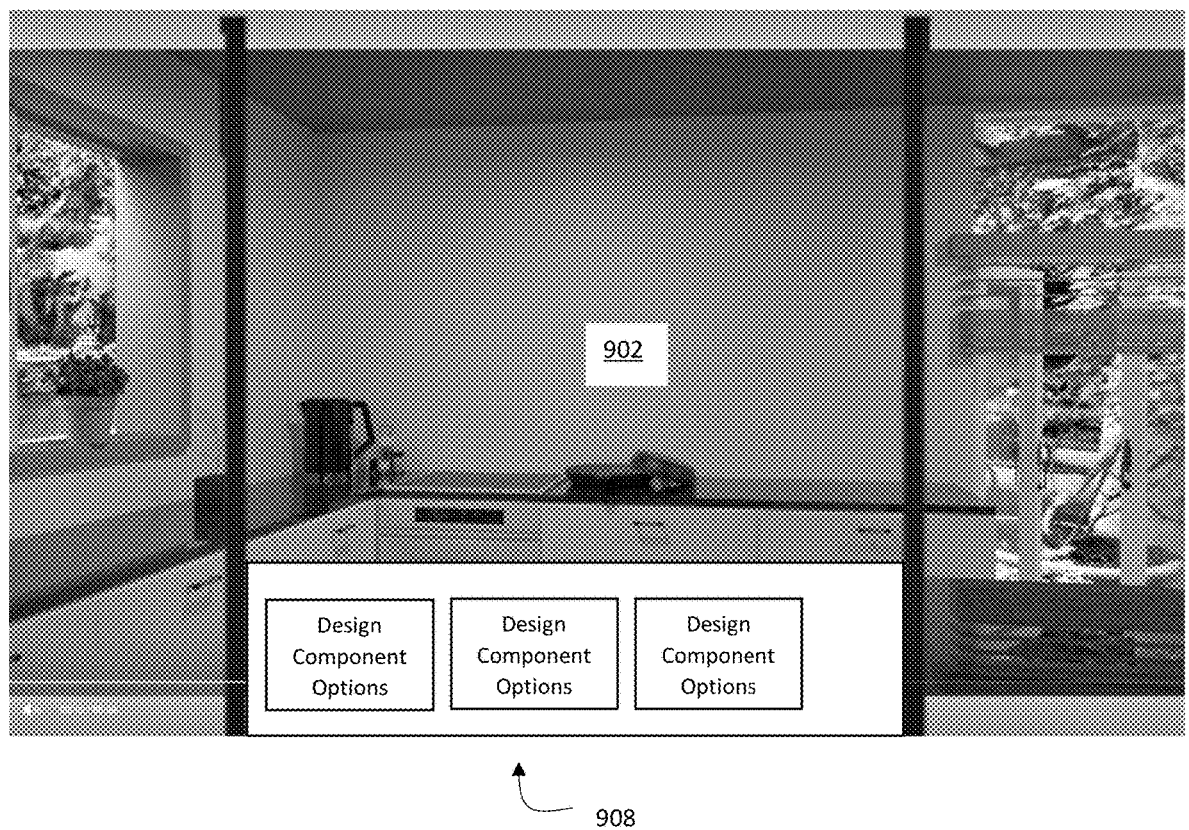
FIG. 9B is a depiction of a photo imaging and measurement application in accordance with an embodiment of the present invention.

Referring to FIG. 9B which includes a depiction of a photo imaging and measurement application in accordance with an embodiment of the present invention. FIG. 9B depicts an embodiment that is in an augmented reality Design View mode. No design components, or other computer rendered components, have been included yet in the AR environment 902 shown on the device screen. Shown along the bottom bar of the application are a set of design component options 908 that the user can drag and drop. The design components 908 may for example be selected, ranked and displayed using a ML or other algorithm. For example, the options 908 may be selected based on the theme of the room or other rooms in the house, the likely return on investment, user inputs, available stock, dimensions, etc.

Figure 9C:
FIG. 9C is a depiction of a photo imaging and measurement application in accordance with an embodiment of the present invention.
Figure 9D:
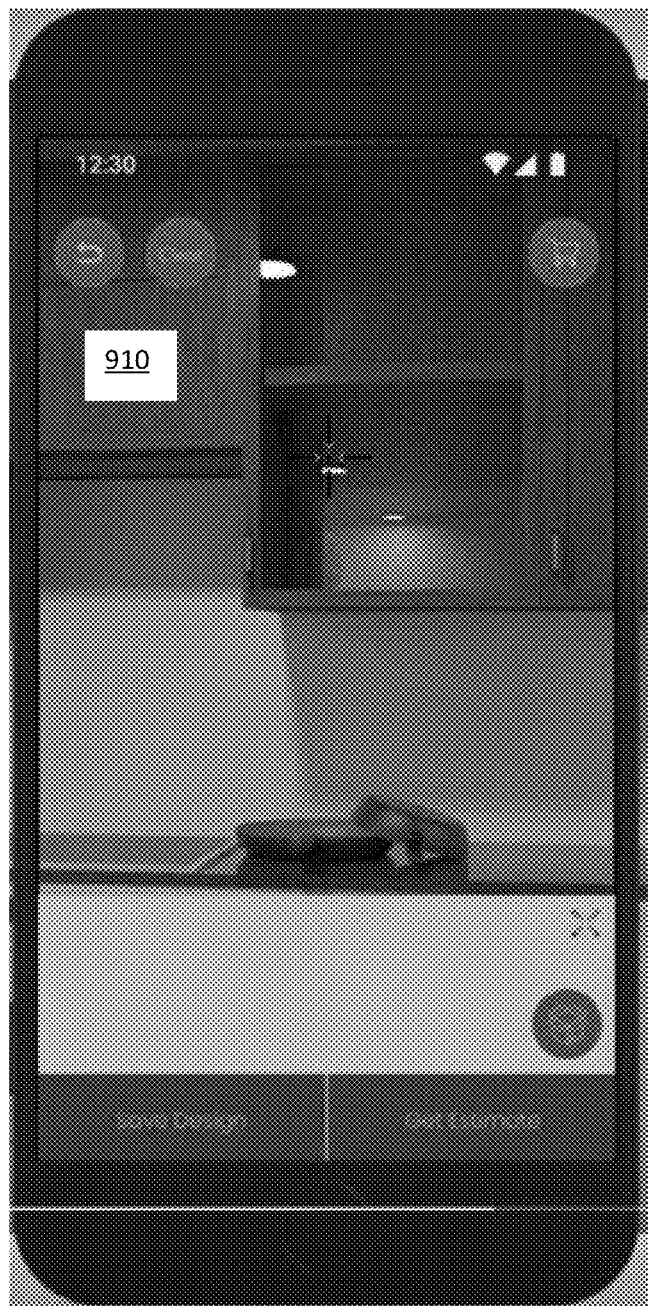
FIG. 9D is a depiction of a photo imaging and measurement application in accordance with an embodiment of the present invention.

FIG. 9C shows a depiction of a photo imaging and measurement application in accordance with an embodiment of the present invention. FIG. 9C depicts an embodiment that is in an augmented reality Design View mode. A kitchen cabinet design component 910 is selected (i.e., dragged and dropped) by the user and rendered on the wall that was previously empty as shown in FIG. 9B. During the drag and drop process, the component 910 may be initially displayed and manipulated by the user (location and orientation) to be established proximate the workspace on the wall and then automatically scaled and rendered in an updated 3D rendering as shown. manipulate a of the selected design component within the augmented reality environment;

Referring to FIG. 9D which includes a depiction of a photo imaging and measurement application in accordance with an embodiment of the present invention. FIG. 9D depicts an embodiment that is in an augmented reality Design View mode and has a kitchen cabinet rendered on a mobile device similar to the embodiment of FIG. 9C. In this case, the user has zoomed into a particular area of the design component 910 within the AR environment.

Embodiments of the invention may be practiced as methods, systems or devices. Accordingly, embodiments may assume the form of a hardware implementation, a firmware implementation, an entirely software implementation or an implementation combining software, firmware and hardware aspects. The detailed description here is, therefore, not to be taken in a limiting sense.

Unless specifically stated otherwise here, it is intended that throughout the description, terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The processes and displays presented herein are not inherently related to any particular computer or other apparatus. General-purpose systems may be used with programs in accordance with the disclosure here, or more specialized apparatus may be utilized to perform the required method steps.

In addition, the present invention is not described with reference to any particular programming language. It will be appreciated that a variety of programming languages may be used to implement the teachings of the present invention as described herein, and any references to specific languages are provided for disclosure of enablement and best mode of the present invention.

Embodiments of the present disclosure are described here with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality or procedures involved. Additionally, not all of the blocks shown in any flowchart need to be performed and/or executed. For example, if a given flowchart has five blocks containing functions or procedures, it may be the case that only three of the five blocks are performed and/or executed. In this example, any of the three of the five blocks may be performed and/or executed.

The mobile or desktop computing device 100 may include a WIFI or wired network interface. The Computing Device 100 may consist of any of a variety of electronic devices including but not limited to mobile telephones, cellular telephones; PDA's equipped with communication capabilities, and mobile computers or palm computers and desktop personal computers with various wireless or wired communication capabilities. The desktop Computing Device 100 may be comprised of any of the standard devices available including but not limited to devices which support the Apple, Microsoft, or Android operating systems with interfaces to the Internet. In addition to supporting the functionality of the present invention, the Computing Device 100 may also provide common mobile communication functions such as placing telephone calls, email and texting.

It is understood that aspects of the present disclosure may be implemented in any manner, e.g., as a software program, or an integrated circuit board or a controller card that includes a processing core, I/O and processing logic. Aspects may be implemented in hardware or software, or a combination thereof. For example, aspects of the processing logic may be implemented using field programmable gate arrays (FPGAs), ASIC devices, or other hardware-oriented systems.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

While embodiments of the invention have been described in detail above, the invention is not limited to those specific variations. The ascribed invention descriptions should be considered as merely exemplary illustrations set forth for a clear understanding of the principles of the invention. Further variations, modifications, extensions, or equivalents of the invention may be developed without departing from the scope of the invention. It is therefore intended that the invention not be limited to the particular embodiments disclosed as the best mode contemplated for carrying out this invention, but that the invention will include all the embodiments falling within the scope of the appended claims.

What is claimed is:

1. A method comprising:
   collecting, at a server via a network, training data comprising images of rooms;
   determining at the server design components via object recognition operations performed on the images, a set of design components in each of the rooms and at least one profile model applicable to each of the rooms;
   collecting at the server via the network retailer information for a plurality of retail products available via one or more vendor ecommerce sites, wherein the retailer information is indexed by the server against a set of profile models and a set of design components, wherein each of the set of design components comprise a set of purchasable items;
   collecting visual data of a room by taking at least one image via a camera of a mobile computing device and conveying the visual data over the network to the server;
   calculating at the server dimensions of at least one aspect of the room
   determining at the server one of the profile models applicable to the room and determine a plurality of project resource templates applicable to the room given the determined profile model, wherein each project resource template comprises a subset of design components specific to that template and the determined profile model, conveying project resource template information from the server to the mobile device over the network;
   displaying via a user interface of the mobile device via a plurality of project resource templates consistent with the project resource template information;
   selecting at the mobile device one of the project resource templates in response to a user input;
   displaying at the mobile device a set of design components based on a selected project resource template and calculated dimensions of the at least one aspect of the room;
   displaying at the mobile device, an augmented reality environment of the room, the augmented reality environment configured to show the room as the room would be if a user selected one of the set of design components were added to the room, wherein the augmented reality environment of the mobile device is configured to allow the user to engage with the selected design component to manipulate a location and orientation of the selected design component within the augmented reality environment, wherein manipulation of the location and orientation affects a placement of the selected design element, which affects associated purchasable items related to the selected design component as applied to the room per the manipulation;
   generating at the server a cost estimate and a set of materials, comprising a subset of the purchasable items from the vendor ecommerce sites to complete a project with the selected design component given the manipulation; and
   providing an online cart via the mobile device for purchasing the selected design component and the set of materials.

2. The method of claim 1, wherein displaying the augmented reality environment further comprising:
   displaying the plurality of design components as a selectable set of items;
   dragging a first digital representation of the selected design component in response to a user input from the set of selectable items via a touch-enabled display of the mobile device;
   establishing the first digital representation at a first position within the augmented reality environment; and
   rendering an updated digital representation of the selected design component at the first position.

3. The method of claim 2, wherein the updated digital representation renders the selected design component to scale relative to the room within the augmented reality environment.

4. The method of claim 1, wherein collecting visual data of the room includes generating a panoramic image of the room.

5. The method of claim 1, wherein displaying the plurality of design components includes executing a machine learning algorithm that ranks the plurality of design components.

6. The method of claim 1, wherein collecting visual data of the room includes capturing an image of the room via a camera of the mobile computing device.

7. A method comprising:
   training a machine learning algorithm of a server communicatively linked to a network, including:
      collecting via the network a real property listing data set from a plurality of real estate listings that includes images of each listing;
      processing at the server images of each listing of the data set to identify design components;
      assigning at the server a tag for design components identified in each listing;
      compiling at the server a real property training data set that includes assigned tags for each identified design component;
      producing at the server a plurality of potential design components having assigned tags comprising dimensions of each of the potential design components and at least one component image;
   collecting visual data, comprising an image, of a room via a mobile computing device by at least capturing the image of the room via a camera of the mobile computing device;
   conveying via the network the visual data, from the mobile device to the server;
   executing at the server an image recognition program configured to determine from analyzing at least one room design component solution for the room, wherein the room design component solution comprises at least one of the potential design components for the room automatically determined by the server for the room based upon results from of the unsupervised learning module and the real property training data set;
   generating at the server, an augmented reality objects, which are conveyed over the network from the server to the mobile device, wherein the augmented reality objects comprise an object for at least a portion of the room an object for the potential design component of the room design component solution, wherein the augmented reality objects are scaled relative to each other based at least in part on server determined dimensions of the room from the image and upon dimensions of the potential design component as specified by the associated tags; and
   displaying within an augmented reality interface of an augmented reality environment of the mobile device comprising the augmented reality objects received from the server, wherein the augmented reality environment is configured to allow a user to engage via the mobile device with at least a location and orientation of the potential design component as presented relative to the room as visually rendered within augmented reality interface.

8. The method of claim 7,
running an unsupervised learning module based on the real property training data set to produce the potential design components.

9. The method of claim 7, wherein collecting visual data includes capturing an image of the room via a camera of the mobile computing device.

10. The method of claim 7, wherein collecting visual data includes generating a panoramic image of the room.

11. The method of claim 7, wherein displaying the augmented reality environment further comprises:
rendering a list of the plurality of design components;
dragging a first digital representation of the selected design component in response to a user input from the list of the plurality of design components via the touch-enabled display;
establishing the first digital representation at a first position within the augmented reality environment; and
rendering an updated digital representation of the selected design component at the first position.

12. The method of claim 11, wherein the updated digital representation renders to scale relative to the room within the augmented reality environment.

13. The method of claim 7, further comprising:
displaying a plurality of project resource templates related to home improvement projects; and
selecting a project resource template in response to a user input.

14. A system comprising:
a server comprising a server memory and a server processor;
a mobile computing device connected to the server via a network, the mobile computing device comprising:
a memory;
a processor coupled to the memory and configured to:
collect visual data of a first location comprising a room via an image taken from a camera of the mobile computing device;
collect second visual data of a second location comprising a second room via a second image taken from the camera of the mobile computing device;
convey the visual data and the second visual data from the mobile computing device to the server via the network; wherein the server is configured to:
calculate at the server dimensions of at least one aspect of the first location and of the second location;
execute a machine learning algorithm one the visual data of the first location, wherein the machine learning algorithm is configured to:
identify a first theme of the first location;
rank a plurality of previously stored design components;
recommend a design component to install in the second location based on the first theme and results of ranking the previously stored design components, wherein the recommended design component is configured to fit in a specific work area having work area dimensions, which are a subcomponent of the server calculated dimensions of the second location; and
convey the recommended design component and calculated work area dimensions over the network to the mobile computing device;
receive the recommended design component and calculated work area dimensions at the mobile computing device;
display a plurality of project resource templates for the second room, each of the product resource templates comprising the recommended design component;
receive at the mobile computing device a selected project resource template in response to a user input;
display the recommended design component based on the selected project resource template and based upon the calculated work area dimensions;
display an augmented reality environment of the second room showing the recommended design component positioned within the work area per the calculated work area dimensions, the augmented reality environment configured to allow a user to engage with the recommended design component to manipulate a location and orientation of the recommended design component within the augmented reality environment affects a set of materials needed when installing the recommended design component in the second location,
wherein the server is configured to generate a cost estimate and a set of materials to complete a project with the recommended design component as manipulated by the user via the augmented reality environment and is configured to convey the generated cost estimate to the mobile device over the network; and
responsive to receiving the generated cost estimate at the mobile device, provide via the mobile device an online cart for purchasing the recommended design component as manipulated, the set of materials, and the generated cost estimate.

15. The system of claim 14, wherein displaying the augmented reality environment further comprises:
displaying the plurality of design components as a selectable set of items;
moving a first digital representation of the selected design component in response to a user input from the set of selectable items via the touch-enabled display;
establishing the first digital representation at a first position within the augmented reality environment; and
rendering an updated digital representation of the selected design component at the first position, wherein the updated digital representation renders the selected design component to scale relative to the room within the augmented reality environment.

16. The system of claim 14, wherein collecting visual data of the room includes generating a panoramic image of the room that includes a plurality of work areas.

17. The system of claim 14, wherein recommending the design component includes executing an image recognition function derived from a training data set comprising a plurality of design component images.

\* \* \* \* \*